US012339992B2

(12) United States Patent
Harris et al.

(10) Patent No.: US 12,339,992 B2
(45) Date of Patent: *Jun. 24, 2025

(54) DATA SECURITY HUB

(71) Applicant: Visa International Service Association, San Francisco, CA (US)

(72) Inventors: Theodore Harris, San Francisco, CA (US); John F. Sheets, San Francisco, CA (US); Mark Nelsen, Oakland, CA (US); Yue Li, San Mateo, CA (US); Craig O'Connell, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 17/864,287

(22) Filed: Jul. 29, 2022

(65) Prior Publication Data
US 2022/0358242 A1    Nov. 10, 2022

Related U.S. Application Data

(63) Continuation of application No. 16/759,453, filed as application No. PCT/US2017/059124 on Oct. 30, 2017, now Pat. No. 11,429,745.

(51) Int. Cl.
*G06F 21/62* (2013.01)
*G06F 21/45* (2013.01)
(Continued)

(52) U.S. Cl.
CPC .......... *G06F 21/6245* (2013.01); *G06F 21/45* (2013.01); *H04L 63/083* (2013.01);
(Continued)

(58) Field of Classification Search
CPC ................. G06F 21/45; G06F 21/6245; G06F 2221/2113; H04L 63/083; H04W 12/02; H04W 12/06; H04W 12/67
See application file for complete search history.

(56) References Cited

U.S. PATENT DOCUMENTS 7,890,530 B2   2/2011 Bilger et al.
8,140,340 B2   3/2012 Bhogal et al.
(Continued)

FOREIGN PATENT DOCUMENTS

EP      1074136 B1      2/2001
WO      2013101245 A1   7/2013

OTHER PUBLICATIONS

U.S. Appl. No. 16/759,453, "Non-Final Office Action", Oct. 4, 2021, 12 pages.
(Continued)

*Primary Examiner* — Chau Le
(74) *Attorney, Agent, or Firm* — Kilpatrick Townsend & Stockton LLP

(57) ABSTRACT

Client devices can send access request messages to resource management computers to request access to a resource. A data security hub can provide centralized routing between different client devices, resource management computers, and authentication data processing servers. The data security hub can reduce the risk of sensitive authentication information from leaking (e.g., due to a breach) by limiting the amount or types of authentication information distributed to the data processing servers. The data security hub can limited the authentication information being distributed based on its sensitivity, the trust level of the client device, and the security level of the requested resource. The data security hub can also evaluate the client devices and data processing servers to identify security breaches and can cancel or reroute access requests accordingly. Thus, the data security hub can maintain resource security while better preserving the privacy of the client device's authentication information.

20 Claims, 4 Drawing Sheets

(51) Int. Cl.
*H04L 9/40* (2022.01)
*H04W 12/02* (2009.01)
*H04W 12/06* (2021.01)
*H04W 12/67* (2021.01)
*G06F 16/24* (2019.01)

(52) U.S. Cl.
CPC ........... *H04W 12/02* (2013.01); *H04W 12/06* (2013.01); *H04W 12/67* (2021.01); *G06F 16/24* (2019.01); *G06F 2221/2113* (2013.01)

(56) References Cited

U.S. PATENT DOCUMENTS

| | | | |
|---|---|---|---|
| 8,141,140 B2 | 3/2012 | Wenzel et al. | |
| 8,621,209 B1 * | 12/2013 | Johansson | H04L 63/08 713/170 |
| 8,856,169 B2 | 10/2014 | Zhang et al. | |
| 8,984,581 B2 | 3/2015 | Luna et al. | |
| 9,356,968 B1 | 5/2016 | Dotan et al. | |
| 10,972,458 B1 | 4/2021 | Gaeta et al. | |
| 2004/0044655 A1 | 3/2004 | Cotner et al. | |
| 2010/0275249 A1 | 10/2010 | McCann et al. | |
| 2011/0202985 A1 | 8/2011 | Kamakura | |
| 2011/0296430 A1 | 12/2011 | Jandhyala et al. | |
| 2013/0083036 A1 * | 4/2013 | Cario | A63F 13/45 345/473 |
| 2014/0130127 A1 | 5/2014 | Toole et al. | |
| 2014/0373104 A1 * | 12/2014 | Gaddam | H04L 63/105 726/4 |
| 2016/0087957 A1 * | 3/2016 | Shah | H04L 63/205 726/1 |
| 2016/0248752 A1 | 8/2016 | Blinn | |
| 2017/0048230 A1 * | 2/2017 | Johansson | H04L 9/3271 |
| 2018/0352005 A1 * | 12/2018 | Gaddam | H04L 63/205 |
| 2021/0392130 A1 * | 12/2021 | Verma | G06F 21/45 |

OTHER PUBLICATIONS

U.S. Appl. No. 16/759,453, "Notice of Allowance", Apr. 20, 2022, 7 pages.

PCT/US2017/059124, "International Preliminary Report on Patentability", May 14, 2020, 9 pages.

PCT/US2017/059124, "International Search Report and Written Opinion", Jul. 13, 2018, 13 pages.

* cited by examiner

DATA SECURITY HUB

CROSS-REFERENCE TO RELATED APPLICATIONS

The present application is a continuation of U.S. patent application Ser. No. 16/759,453, filed on Apr. 27, 2020, which is a 371 National Stage of International Patent Application No. PCT/US2017/059124 filed on Oct. 30, 2017, the entire disclosures of which are incorporated by reference herein in their entireties.

BACKGROUND

Client devices (e.g., personal computers, smartphones, etc.) can be used to access a variety of secure resources such as user accounts, information databases, file storage, website logins, and digital wallets. In order to prevent fraud, resource managers may require authentication information of the user or the client device to be validated before granting access to the resource. For example, a resource manager of an online storage system may require a device's network address to be validated, in addition to verifying the user's account name and password.

While a resource management computer may store an internal database for matching account names with the passwords, the resource management computer may rely on third party data processing servers to validate authentication information. For example, the resource manager of the online storage system may send the client device's network address to a third party data processing server that specializes in network address risk analysis. The resource management computer may authenticate the client device based on a risk score determined by the data processing server. For instance, if the risk score is over a predetermined limit, then the resource management computer may deny access to the account even if the correct password was provided by the client device.

While resource security can be improved by validating authentication information, this increases complexity due to the different requirements and capabilities of the various client devices, resource management computers, and data processing servers. Thus, authentication of an access request becomes increasingly complex. There is a need for improved systems and methods for processing access requests among various client devices, resource managers, and authentication data processing servers while maintaining the privacy and security of personal user information and device information.

BRIEF SUMMARY

Client devices can send access request messages to resource management computers to request access to a resource. An data secure hub (e.g., an authentication hub) can provide centralized routing between numerous different client devices, resource management computers, and authentication data processing servers. The data security hub/authentication hub can reduce the risk of sensitive authentication information from leaking (e.g., due to a breach at a data processing server) by minimizing the amount or types of authentication information distributed to the data processing servers. The authentication hub can restrict the authentication information being distributed based on its sensitivity, the trust level of the client device, and the security level of the requested resource. The authentication hub can also monitor and evaluate the client devices and the data processing servers to identify security breaches and can cancel or reroute access requests accordingly. Thus, the authentication hub can maintain resource security while better preserving the privacy of the client device's authentication information.

Some embodiments provide an authentication hub for processing and routing access request messages. The authentication hub can include a computer readable storage medium storing a plurality of instructions and one or more processors for executing the instructions stored on the computer readable storage medium. By executing the instruction, the authentication hub can receive an access request message from a client device. The access request message can requesting access to a resource. The authentication hub can analyze the access request message to determine one or more types of authentication information included in the access request message. The authentication hub can then determine sensitivity levels corresponding to the one or more types of authentication information. The authentication hub can restrict the one or more types of authentication information based on the sensitivity levels and a risk level of the resource to obtain a restricted set of authentication information.

After restricting the one or more types of authentication information, the authentication hub can identify set of data processing servers capable of processing the restricted set of authentication information. Then the authentication hub can select a first data processing server from the set of data processing servers. The first data processing server can be selected based on an evaluated trust level and a network condition of the first data processing server. The authentication hub can then send an authentication request including the restricted set of authentication information to the first data processing server.

The authentication hub is advantageous because it can also reduce the risk of sensitive authentication information from leaking (e.g., due to a breach at a data processing server) by minimizing the amount or type of authentication information sent to the data processing servers, while maintain resource security by authenticating the client devices.

Other embodiments are directed to methods for processing and routing messages. A better understanding of the nature and advantages of the present embodiments may be gained with reference to the following detailed description and the accompanying drawings.

DETAILED DESCRIPTION

Figure 1:
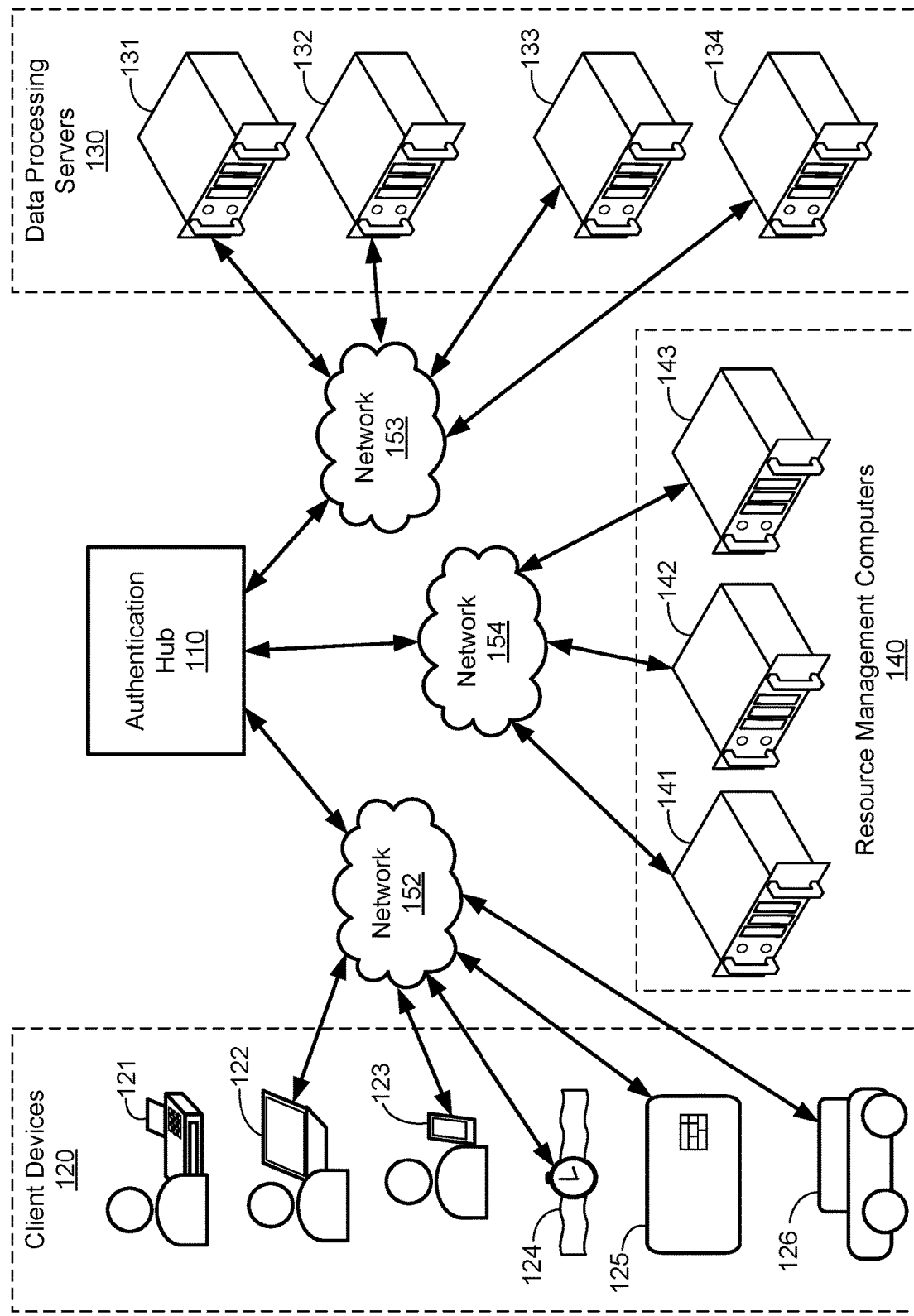
FIG. 1 shows a system diagram of an authentication hub in communication with client devices, data processing servers, and resource management computers, in accordance with some embodiments.

Client devices such as personal computers, smartphones, tablets, and wearable devices can be used to request access to resources. For example, a client device can request access to login to a local or remote user account, gain permissions to files or settings, retrieve or store information in a database, make payment transactions, or gain access to a physical structure. To request access to a particular resource, a client device can send an access request message to the resource management computer associated with the requested resource.

However, simply verifying that the correct password has been provided may not be sufficient to prevent unauthorized access to resources. For instance, someone besides the original user may obtain physical access to the user's client device and use stored user names and passwords to fraudulently request access to resources. In other cases, account names and passwords may be leaked by a security breach at the resource manager or another third-party, enabling fraudsters to gain access to the same or other accounts using the leaked passwords. Passwords could also be guessed using a brute-force attack or other cracking technique.

To prevent fraudulent access, resource management computers may require client devices to provide authentication information of the user or the client device (e.g., personal or sensitive information) in addition to an account name and/or password. The resource manager can determine the types and amount of authentication information that would be required for authentication based on the security level of the particular resource. For example, the resource manager of medical record resources may assign a higher security level to those resources compared to the security level assigned to user login accounts by the resource manager of a news website. This may be because the medical records are more personal and sensitive compared to the information found in the user accounts of the news website. Accordingly, the resource management computer managing the medical records may require a network address of the client device, a hardware identifier of the client device, and a fingerprint scan of the user for authentication, while a second resource management computer managing the news website may only require the network address of the client device for authentication.

While many resource management computers can store an internal database for verifying passwords for accounts, most resource management computers are not be capable of validating or evaluating the various types of authentication information. As such, a resource management computer may rely on third party data processing servers to validate authentication information. Different data processing servers may be capable of validating or evaluating different types of authentication information. Examples of the different types of authentication information include the user's biometric information, the user's personal address, the users government issued identifiers, personal information of the user, the client device's network address, a hardware identifier of the client device, or an interaction history of the client device. The resource management computer may use rely on different data processing servers for handling different types of authentication information. For example, a resource manager may use one data processing server to evaluate a client device's network address and another data processing server to evaluate the client device's hardware identifier. Thus, resources can be secured by preventing access to users or devices lacking proper authentication information, even if they have provided the proper account name and/or password.

While resource security can be improved by validating authentication information, this increases complexity due to the different requirements and capabilities of the various client devices, resource management computers, and data processing servers. For instance, each data processing server may validate authentication information for numerous different resource managers, which may have different authentication requirements. Thus, the data processing servers may need to maintain different interfaces and authentication rules to accommodate the different resource managers. In addition, different types of client devices may have different capabilities in providing certain types of authentication information. As such, resource management computers may need to be configured to handle access requests in different formats for the different types of client devices. However, it may not be practical to specifically configure the resource management computers for each new type of client device that is developed. Another complication is that some users or devices may be unwilling to provide a certain types of authentication information required by certain resource management computers due to privacy concerns.

Thus, authentication of an access request can become increasingly complex for the resource management computer due to the need to configure the types of authentication information used depending on the particular requirements of the client device and the data processing server. There is a need for improved systems and methods for processing and routing access requests while maintaining the privacy and security of personal user information and client device information.

The data security hub (e.g., authentication hub) described herein addresses these issues by providing centralized processing and routing between numerous different client devices, resource management computers, and data processing servers. The authentication hub can also reduce the risk of sensitive authentication information from leaking (e.g., due to a breach at a data processing server) by minimizing the amount or type of authentication information sent to the data processing servers. To reduce the risk of sensitive information leaking, the authentication hub can restrict the type and amount of data included in the access request based on the sensitivity level of the authentication data, and the trust level of the client device, and the security level of the requested resource.

In one example, the authentication hub can receive an access request message from a mobile phone requesting access to files stored at a data storage server. In this example, the access request message can include a password of a user of the mobile phone, a device ID of the mobile phone, and a fingerprint scan of the user of the mobile device. The password, device ID, and fingerprint being different types of authentication information for authenticating the user or mobile phone making the access request. The authentication hub can scan receive the access request message from the mobile phone and scan it to determine the identity of client device (e.g., the mobile phone) that is requesting access, which types and amounts of resources are being requested, and what types of authentication information are included in the access request.

After determining the identity of the mobile phone (e.g., based on a device ID of the client device, an account number, or another hardware identifier of the mobile phone), the authentication hub can determine a trust level of the mobile phone based on client historical information. The client historical information can include information of previous access requests made by client devices, and whether the client device was authenticated for a particular access request, and whether certain types of authentication information was validated, or not, for a particular access request. For instance, a first client device that has been authenticated for 10 previous access requests may have a higher trust level than a client device that has been authenticated for one previous access request.

The client trust level can also be based on an access level for a particular client device that has been set for a particular resource. For example, a first client device having a higher access level may have a higher trust level than a second client device having the same or similar historical information (e.g., same or similar number of previously authenticated access requests), but having a lower access level. The access level may be represented numerically, or using ranked terms or grades. In the example above, the mobile device may have previous requested access to resources on 30 different occasions and have been authenticated for each one. In addition, the mobile device may be assigned a "high" access level (as opposed to a "medium" or "low" access level). In this example, the authentication server may use a decision tree or other scoring algorithm to determine that the mobile device has a "high" trust level (as opposed to a "medium" or "low" trust level), based on the access level of the mobile phone and the client historical information for the mobile phone. In some embodiments, the authentication hub may receive access level information for one or more client devices from a resource management computer for that resource.

After determining the types and amounts of resources are being requested, the authentication hub can determine the resource security level of the requested resource. In the example above, the mobile phone can request access to two files, the first being a less-sensitive audio file and the second being a more-sensitive word document created by the user. The authentication hub can determine a resource security level for each of the resources requested by the mobile device (e.g., the two files). The resource security level can be determined based on resource type (e.g., an image or a word file). The resource security level can also be based on resource risk levels set by a resource management computer in a set of resource manager rules. For instance, specific files or file types can be assigned to a higher or lower risk level. In this example, the audio file may be assigned a low resource risk level while the document can be assigned a medium resource risk level. The authentication hub may determine that, in combination, the resource risk level may be a medium risk level.

After determining the types of authentication information that are included in the access request, the authentication hub can determine the sensitivity levels of each type or piece of authentication information. In this example, the access request received from the mobile phone may include a password of a user of the mobile phone, a device ID of the mobile phone, and a fingerprint scan of the user of the mobile device. The authentication hub may determine that the fingerprint scan of the user has a higher sensitivity level than the password of the user (e.g., because the password of the user may be changed while the fingerprint of the user may not be changed), and that the device ID of the mobile phone has a lower sensitivity level than either the password or the fingerprint scan (e.g., because this information is assigned to the mobile phone and not the user).

After determining the client trust level, the resource security level, and the sensitivity levels of the authentication information, the authentication hub can use an automated AI to determine a limited set of authentication information based on the authentication information received from the mobile phone. The authentication information is limited in the sense that certain types of authentication information are removed, portions or a certain piece of authentication information is removed or obscured, or, some or all of a certain piece of authentication information is obfuscated, while still being able to be validated. In this example, the mobile phone has a high client trust level and that the resources have a medium risk level. Based on this information, the automated AI may determine that highly sensitive authentication information is not needed to authenticate the access request. That is, the automated AI may determine that the access request can be validated using the password and the device ID, but not the fingerprint scan, because the fingerprint scan is more sensitive than the password and the device ID. More sensitive information, such as the fingerprint scan, may not be needed to authenticate the access request since the mobile phone has a high trust level and the resource risk level at a medium risk level. In situations where the mobile phone has a lower trust level, or where the resource risk level is greater, than the automated AI may determine that more sensitive information, such as the finger print scan, may be used to authentication the access request.

The automated AI may be based on a graph learner (e.g., restricted Boltzmann Machine, or K-means clustering, etc.). The graph can be based on a plurality of previously received access requests and validation information for those access requests. For instance, that graph can be based the types of authentication information included in the access request, the type and amount of resources requested in the access request, the date of the access request, the time of day that the access request was made, the geo-location of the client device making the access request, the network address of the client device, an identifier of the resource management computer that manages the request resource, whether or not the access request was granted, whether or not certain pieces of authentication information were validated, or not, whether or not a particular previous access request had been reported as fraudulent, or not, and any other information related to the access request, the client device making the access request, or the user of the client device that is requesting access.

The automated AI can use a learner algorithm or decision tree to determine one or more decisions for a new access request (e.g., the access request from the mobile phone, which may be received in real time). In some embodiments, the decisions determined by the automated AI can be "YES/NO," such as, "YES—the password will be used to authenticate the access request" or "NO—the fingerprint scan will not be used to authenticate the access request." Another decision determined by the automated AI may be whether or not to apply secure multi-party computation techniques to the authentication information to obfuscate it. Another decision that can be determined by the automated AI is the level of encryption to be used for the authentication requests or for secure multi-party computation. An automated AI can also be used to select which data processing server, from among a plurality of data processing servers, should be selected to process a particular piece of authentication information.

Thus, the authentication hub can maintain resource security while better preserving the privacy of the client device's authentication information. The authentication hub can also monitor and evaluate the client devices and the data processing servers to identify security breaches and can cancel or reroute access requests accordingly. The authentication hub can also dynamically adjust the routing of access requests among different data processing servers based on the network conditions of the routes to them and their capability in processing the authentication validation timely.

These features of the authentication hub and others are described in further detail below.

I. Terms

Explanation and description of some of the terms and phrases used in the Detailed Description are provided below.

An "access request message" refers to a message sent by a client device to request access to a resource. The resource may be management by a particular resource management computers. The client device may send the access request message to an authentication hub, which may authenticate the access request message prior to sending it to the corresponding resource management computer. The access request message can include authentication information that may be validated by either the authentication hub or a data processing server. Different types of client devices may generate access requests according to different APIs or protocols.

"Authentication information" may be information that can be used to authenticate a user or a client device. That is, the authentication information may be used to verify the identity of the user or the client device. In some embodiments, the user may input the authentication information into a device during an authentication process. Examples of authentication information that can be input by a user of the client device include biometric data (e.g., fingerprint data, facial recognition data, 3-D body structure data, deoxyribonucleic acid (DNA) data, palm print data, hand geometry data, retinal recognition data, iris recognition data, voice recognition data, etc.), passwords, passcodes, personal identifiers (e.g., government issued licenses or identifying documents), personal information (e.g., address, birthdate, mother's maiden name, or phone number), and other secret information (e.g., answers to security questions). Authentication information can also include data provided by the device itself, such as hardware identifiers (e.g., an International Mobile Equipment Identity (IMEI) number or a serial number), a network address (e.g., internet protocol (IP) address), interaction information, and Global Positioning System (GPS) location information).

A "limited set of authentication information" or a "restricted set of authentication information" refers to a set of authentication information that has been limited or restricted from the set of authentication information received in an access request. The authentication information may be limited in that certain types of authentication information are removed, portions or a certain piece of authentication information is removed or obscured, or, some or all of a certain piece of authentication information is obfuscated, while still being able to be validated. For example, more sensitive authentication information (e.g., authentication information determined to have a higher sensitivity level) that is included in an access request may not be included in the limited set of authentication information. In another example, more sensitive authentication information may be obfuscated (e.g., using secure multi-party computation techniques).

A "trust level" refers to the trustworthiness of a client device. The trust level can be based on historical information corresponding to the client device, such as information regarding previous access requests made by client devices, and whether the client device was authenticated for a particular access request, and whether certain types of authentication information was validated, or not, for a particular access request. A first client device that have a high percentage of access requests being authenticated may have a high trust level while a second client device having a lower percentage of access requesting being authentication may have a low trust level. The trust level may also be based on an "access level" assigned to the client device by a resource management computer. Certain client devices may be assigned a "high" access level, indicating that they are more "trustworthy" (e.g., have a higher trust level) compared to client devices having a lower access level.

A "network condition" can refers to the responsiveness of a data processing server in responding to authentication requests. The network condition of a data processing server can indicate the capacity or availability of that data processing server for processing current and/or future authentication requests. The "network condition" of a data processing server can be based on one or more authentication response times (e.g., the difference between a first time when the authentication hub sends an authentication request message and a second time when the authentication hub receives an authentication response message from the data processing server, in response to the authentication request). A poor network condition (e.g., long response time) may indicate that the data processing server is overloaded and cannot handle addition authentication requests in a timely manner (e.g., within a predetermined response time limit). A poor network condition may also indicate that the data processing server has been breached since worms and other malware may slow down network and computing performance of the infected system.

A "linguistic parser" refers to an artificial intelligence algorithm for processing natural language to determine the elements, relationships, and grammatical structure of sentences (e.g., which characters are words, whether a word is a noun or verb, or which words is the subject or object of a particular verb). An authentication hub may use a linguistic parsing algorithm to build data structures that represent the API of a particular access request message, similar to how linguistic parsing algorithms may be used to represent the structure of a sentence in a natural language. In parsing an access request message, the authentication hub may first create a sequence of symbols or tokens corresponding to the API, protocol, or format of the access request message. The symbols/tokens can correspond to the data fields of the access request (e.g., routing information, authentication information, metadata, etc.). Then the authentication hub can create a data structure (e.g., a parse tree or a syntax tree) that represents the API of the access request.

A "resource manager" can be any entity that provides resources. Examples of a resource managers include a website operator, a data storage provider, an internet service provider, a merchant, a bank, a building owner, a governmental entity, etc. Any entity that maintains accounts for users or that can provide information, data, or physical objects to users may be considered a "resource manager."

"Secure multi-party computation" refers to a process that uses cryptographic techniques to enable multiple entities to jointly compute a function while keeping their inputs into the function private. For example, a client device and a data processing server can use secure multi-party computation to determine whether the authentication information provided by the client device is valid or not, without revealing what the authentication information is. Secure multi-party computation is further described in International Patent Application No. PCT/US2017/024099, filed on Mar. 24, 2017 and titled "Authentication System Using Secure Multi-Party Computation," which is hereby incorporated by reference in its entirety.

An "application programming interface" (API) refers to a set of routines and protocols defining how software components should communicate and interact. For example, an API for requesting access to resources can define the format and protocol of access request messages, including the required data fields. An API for requesting access to resources can also define what types of authentication information should, or should not, be included in the access request message.

The phrase "interaction information" data that may be used to conduct a risk evaluation. Interaction information may include data on the type of interaction being conducted by the user of a client device (e.g., tracking the users use of the client device). Interaction information may also include length of interaction, time of day of interaction, etc. The interaction information may be used as part of a risk evaluation of the client device, where different interactions may have different levels of risk associated with them. The interaction information may be tracking in a log file that is provided in an access request.

An 'Artificial Intelligence' (AI) algorithm may refer to a graph learner (e.g., restricted Boltzmann Machine, or K-means clustering, etc.), search optimization algorithms (e.g., Ant Colony), scoring algorithms (e.g., an artificial neural network or vector distance model), machine learning algorithms, or a combination of more than one algorithm. An AI algorithm may also refer to the use of a behavior tree to determine one or more actions based on output from any, or a combination of, the AI algorithms mentioned above. In one example, the AI algorithm can include a k-means clustering algorithm that divides a graph into a plurality of overlapping trees, each comprising a subset of nodes and edges from the graph.

In some embodiments, the input graph used for the AI algorithm can be based on a set of previously received access requests. The data fields and/or parameters of the access requests can be represented as nodes in the graph. For example, the graph may be based the types of authentication information included in the access request, the type and amount of resources requested in the access request, the date of the access request, the time of day that the access request was made, the geo-location of the client device making the access request, the network address of the client device, an identifier of the resource management computer that manages the request resource, whether or not the access request was granted, whether or not certain pieces of authentication information were validated, or not, whether or not a particular previous access request had been reported as fraudulent, or not, and any other information related to the access request, the client device making the access request, or the user of the client device that is requesting access.

The automated AI can use a learner algorithm or decision tree to determine one or more decisions for a new access request (e.g., the access request from the mobile phone, which may be received in real time). In some embodiments, the decisions determined by the automated AI can be "YES/NO," such as, "YES—the password will be used to authenticate the access request" or "NO—the fingerprint scan will not be used to authenticate the access request." Another decision determined by the automated AI may be whether or not to apply secure multi-party computation techniques to the authentication information to obfuscate it. Another decision that can be determined by the automated AI is the level of encryption to be used for the authentication requests or for secure multi-party computation. An automated AI can also be used to select which data processing server, from among a plurality of data processing servers, should be selected to process a particular piece of authentication information.

A "computing device" may be any suitable electronic device that can process and communicate information to other electronic devices. The computing device may include a processor and a computer readable medium coupled to the processor, the computer readable medium comprising code, executable by the processor. The computing device may also include input devices and output devices that are operatively coupled to the processor, as well as an external communication interface for communicating with other computing devices or other entities. For example, the computing device can provide remote communication capabilities to a network. Examples of these remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network, Some exemplary types of computing device may include a mobile device, a cardholder device, a user device, a consumer device, a server computing device, an appliance, and any computer. Some non-limiting examples of mobile devices include mobile phones (e.g., cellular phones), keychain devices, personal digital assistants (PDAs), pagers, notebooks, laptops, notepads, net books, tablet computers, wearable devices (e.g., smart watches, fitness bands, jewelry, etc.), automobiles or motorcycles with remote communication capabilities, person music player devices, personal computers, hand-held specialized readers, and the like.

A "server computer" may include any suitable computer that can provide communications to other computers and receive communications from other computers. A server computer may include a computer or cluster of computers. For instance, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

Messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

II. Authentication of Resource Access Requests

FIG. 1 shows a system diagram of an authentication hub 110 in communication with client devices 120, data processing servers 130, and resource management computers 140, in accordance with some embodiments. The client devices 120 can include any device that requests access to a resource being managed by one of the resource management computers 140. For example, a client device could be a point of sale terminal 121, a personal computer 122, a mobile device 123, a wearable device 124, a smart card 125 (e.g., a biometric card or payment card), or a vehicle 126. Each of the client devices 120 can communicate with the authentication hub over a first network 152. The client devices 120 may communicate with the network 152 using a wired network connection (e.g., ethernet) or a wireless network connection (e.g., Wi-Fi, cellular, or near field communications).

The client devices 120 can send access requests that include different types of authentication information and that are formatted differently. To communicate with the variety of different client devices 120 and handle the variety of different access request formats, the authentication hub 110 can include an automated client interface automatically adapts the access requests for processing. The client interface can be used for receiving access requests from the client devices 120 and for sending access responses to the client devices 120 over the first network 152.

The authentication hub 110 can also communicate with a plurality of data processing servers 130. Each of the data processing servers 130 may be capable of processing different types of authentication information. For example, a first data processing server 131 can evaluate one or more hardware identifiers of a client device in order to determine whether a particular client device is a security risk. A second data processing server 132 can determine use the network identifier (e.g., IP Address) of the client device to determine whether a particular client device is a security risk. A third data processing server 133 can analyze biometric data (e.g., a finger print scan or a retina scan) of a user of a client device to determine whether it is associated with a registered user. A fourth data processing server 134 can analyze personal information of the user to determine whether it matches stored account information. The four data processing servers 130 described above are merely examples of the various data processing servers that could be in communication with the authentication hub 110. The authentication hub 140 may communicate with other data processing servers to process other types of authentication information.

To communicate with the variety of different data processing servers 130, the authentication hub 110 can include an automated client interface which automatically adapts the access requests for processing. The client interface can be used for receiving access requests from the client devices 120 and for sending access responses to the client devices 120 over the first network 152.

The authentication hub 110 can provide a data processor interface for communicating with the data processing servers 130 over a second network 153. The data processor interface can be used for making authentication requests to the data processing servers 130 and receiving authentication responses from the data processing servers 130 over the second network 153.

The authentication hub 110 can also communicate with a plurality of resource management computers 140. Each of the resource management computers may manage a different type of resource. For instance, a first resource management computer 141 may manage user accounts for a website, a second resource management computer 142 can manage academic resources for a school district, and a third resource management computer 143 can manage payment accounts and provide authorization of payment transactions. The three resource management computers 140 described above are merely examples of the various data processing servers that could be in communication with the authentication hub 110. The authentication hub 140 may communicate with other data processing servers to process other types of authentication information.

The authentication hub 110 can provide a resource manager interface for communicating with the resource management computers 140 over a third network 154. The resource management interface can be used for sending access requests to the resource management computers 140 and receiving access responses from the resource management computers 140 over the third network 154.

The functionality of the authentication hub is described in further detail below with respect to FIG. 2.

Figure 2:
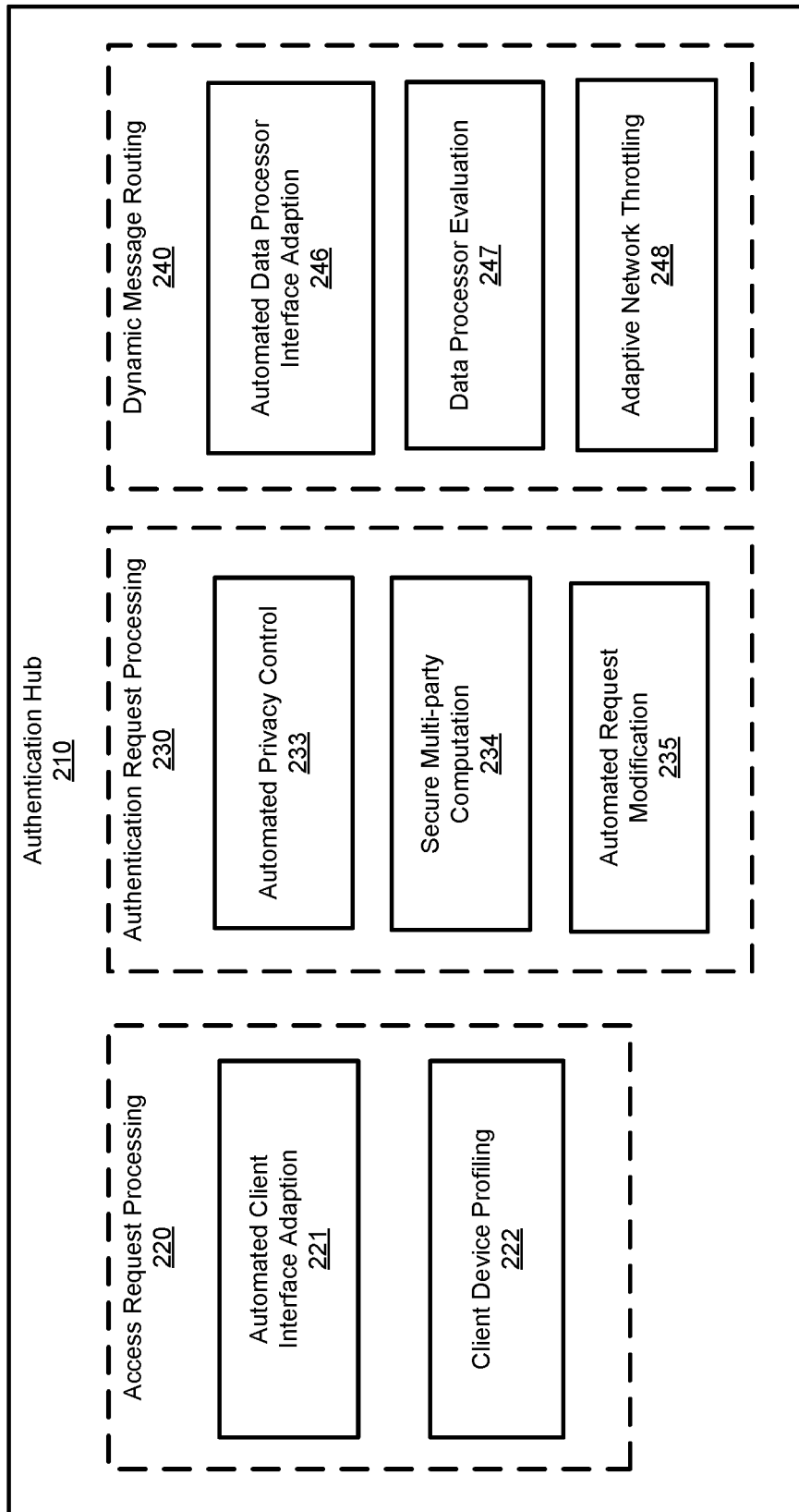
FIG. 2 shows a functional block diagram of an authentication hub, in accordance with some embodiments.

FIG. 2 shows a functional block diagram of an authentication hub 210, in accordance with some embodiments. As shown in FIG. 2, the authentication hub 210 can perform a variety of functions in order to orchestrate communications between a variety of different client devices, data processing servers, and resource management computers while maintaining the security of authentication information. In some embodiments, these functions may be implemented as hardware components of the authentication hub. In other embodiments, these functions may be implemented as software modules on the authentication hub (e.g., instructions stored on a non-transitory computer readable medium that can be executed by a processor to perform the functions). In some embodiments, the authentication hub 210 can include a plurality of computers coupled together in a system, where one or more of the computers performs the different functions of the authentication hub 210. As further described below, the authentication hub 210 can perform access request processing 220, authentication request processing 220, and dynamic message routing 240.

A. Access Request Processing

The authentication hub 210 can perform automated access request processing 210 upon receiving access requests from the variety of different client devices. The authentication hub's automated access request processing 210 functionality includes automated client interface adaptation 221 and client device profiling 222.

In prior resource systems, client devices and resource management computers could communicate using an application programming interface (API) that may have been specifically designed for that particular resource management computer. However, in the embodiments described herein, the authentication hub 210 is the centralized point for communications between the client devices and the resource management computers. Accordingly, the authentication hub 210 can be capable of receiving and processing access requests from a variety of different client devices, including access requests in different formats and including different types of authentication information.

The authentication hub 210 performs automated client interface adaptation 221 in order to handle access requests having new or different formats. That is, instead of being specifically programmed to handle each of the variety of different APIs used by the different resource management computers for communication with the client devices, the authentication hub 210 can automatically adapt the format of incoming access request messages to be compatible with the APIs used by the authentication hub 210. As such, the authentication hub 210 can receive and process access requests that are different formats, including those that are in formats that have never been received or processed before.

If the format of an incoming access request from a client device does not match known access request formats, then the authentication hub 221 can perform automated client interface adaptation 221. To perform automated client interface adaptation 221, the authentication hub 210 can analyze the format of the incoming access request from the client device and then map it to a known API (e.g., a known API used by one of the resource management computers). For instance, the authentication hub 210 can use a linguistic parsing algorithm to build data structures that represent the API of a particular access request message. In some instances, the authentication hub 210 may first perform a lexical analysis of the access request message to create a sequence of symbols or tokens corresponding to the format and information included in that access request message. The symbols/tokens can correspond to the data fields of the access request (e.g., routing information, authentication information, metadata, etc.). Then the authentication hub 210 can perform syntactic analysis on the access request (e.g., on the tokens if lexical analysis was performed) to create a data structure (e.g., a parse tree or a syntax tree) that represents the API of the access request. The authentication hub 210 can then store the API data structure for the client device's API so that it can be used for later access requests using the same API, such that the API data structure does not have to be rebuilt each time.

After the authentication hub 210 has parsed the access request message as discussed above, the authentication hub 210 can map the API data structure generated by the linguistic parsing algorithm to a stored API data structure (e.g., an API data structured previously generated based on the access request API of a particular resource management computer). The authentication hub 210 can store a plurality of previously generated API data structures based on the access request messages used by different resource management computers. In some embodiments, the authentication hub 210 can generate the API data structures for the resource management computers (e.g., when the message format used by a particular resource management computer changes). The authentication hub 210 can determine the best API match for a particular access request by comparison to previously used APIs using fuzzy criteria. Using this process, the authentication hub 210 can determine the format of the access request message and identify the types of authentication information included in it, even if the access request is using on a previously unknown API.

In addition, the authentication hub can recommend a new communication API to the client device. The authentication hub 210 can also add, or remove, data fields or information to the client's access request so that it is compatible with the API of a particular resource management computer.

Furthermore, the authentication hub 210 can also use the API data structures built for automated client interface adaptation 221 to determine whether a client device's API has changed over time. For example, the authentication hub 210 can compare the API data structure for a new access request from a particular client device to the API data structure used for previously received access requests. Based on the comparison, the authentication hub 210 can determine whether the API has changed (e.g., whether the data field names, definitions, or types have changed). The authentication hub 210 may also compare the API data structure for an access request to a pre-determined API data structure (e.g., a preferred API data structure) stored at the authentication hub 210. The authentication hub can use this comparison to generate a set of API change recommendations to be sent to the developer of the client application or client device.

The authentication hub 210 can also perform client device profiling 222 to assess the risk that the client device has been compromised, and that the access request is fraudulent, based on the behavior and interactions of the client device. The authentication hub 210 can determine a risk level indicating the likelihood that the client device has been compromised. The risk level can be based on changes in the formatting of a particular client device's access requests over time. Using historical API data structures for the client device, the authentication hub 210 can determine the amount and types of changes over time. The lack of consistency in the API may indicate that the client device has been compromised.

The authentication hub 210 can also determine the risk level for a client device based on client interaction information included in the access request. The client interaction information can indicate recent and historical actions performed by the client device, such as making or changing information in access requests over time, changing authentication information or settings, changing device settings, or opening or using certain applications.

The authentication hub 210 can compare the interaction information received from a client device to historical interaction information for that client device in order to determine whether the client device is operating as expected. The authentication hub 210 can also compare the interaction information to a set of expected interactions for client devices to determine whether the interactions indicate that the client device has been compromised. The client risk level can be related to the deviation of the client's current behavior compared to their historical and expected behavior. A client device not operating as expected can indicate a security breach at the client device (e.g., physical loss of the client device by the original user or a network security breach). If the client interaction information or the client risk level indicates a security breach, the authentication hub 210 can send a signal to the client device that causes the client device clear its cache and memory of some or all of the authentication information.

The interactions of the client device can be tracked (e.g., by the software application or the resource manager's website) prior to and during the time that the client device makes the access request. In some embodiments, the client device can log or track which actions or operations are being performed, what data or information is being input, what information is being communicated, and the timing of when these operations are being performed. In some embodiments, a resource management computer may track the interactions of the client device through a website, application, or form provided by the resource management computer.

The client device can send this interaction information (e.g., a log of the operations) to the authentication hub 210 in the access request message or it can be sent to the authentication hub 210 by the resource management computer (e.g., upon request by the authentication hub 210). In one example, the interaction information can indicate that the user of the client device logged into a resource manager's website, changed the password associated with the account, changed the address associated with the account, and then requested access to the resource. The authentication hub 210 can determine whether the client device or the account is likely to have been compromised based on a comparison of the interaction information for the client device and a set of expected interactions and the historical interactions of the particular client device. The authentication hub 210 can use this comparison and other information in determining the risk level. As further described below, the types and amount of authentication information needed to authenticate the client device can be based on the risk level.

B. Authentication Request Processing

After the receiving and processing an access request, the authentication hub 210 can perform automated authentication request processing 230. The authentication hub's automated authentication request processing 230 functionality includes automated privacy control 233, secure multi-party computation 234, and automated request modification 235.

The authentication hub 210 can perform automated privacy control 233 to prevent excessive amounts of sensitive authentication information from being distributed to data processing servers or other third parties. By restricting the type and amount of sensitive information used for authentication, the authentication hub 210 can reduce the risk of such information being intercepted or leaked (e.g., due to a security breach at one of the data processing servers).

As part of automated privacy control 233, the authentication hub 210 can determine that more, or less, authentication information is required to authenticate a client device depending on various factors. For example, the authentication hub 210 can determine that less authentication information is required in order to authenticate a client device having a higher trust level compared to a client device having a lower trust level. In addition, the authentication hub 210 can determine that more authentication information is required to authenticate a client device that is requesting resources having a higher resource security level (e.g., a greater amount of resources or a more sensitive type of resource) compared to one requesting resources having a lower security level (e.g., fewer resources or a less sensitive type of resource). In another example, the authentication hub 210 can require more authentication information when a determined threat level within the network is higher, compared to when the determined threat level within the network is lower.

The authentication hub 210 can also assign weights to different types of authentication information such that it has more or less authentication information is needed to validate the client device depending on what type of authentication information is available. In one example, the authentication hub 210 may determine that a certain authentication level is sufficient to authenticate the client device for a particular access request. In this example, the authentication hub 210 may determine that validating biometric information of the user of the client device would meet or exceed the authentication level. The authentication hub 210 may also determine that validating both a network address of the client device and a hardware identifier of the client device would meet or exceed the authentication level. Thus, even if the client device does not provide biometric information, the authentication hub 210 can authenticate the client device as long as its network address and hardware identifier are provided.

Furthermore, even if the client device did provide biometric information, the authentication hub 210 can determine whether the client device should be authenticated using the network address and hardware identifier or using the biometric information based on the sensitivity levels of the different sets of authentication information. For example, the authentication hub 210 can determine that the client device should be authenticated using the network address and hardware identifier, instead of using the biometric information, based on the biometric information having a higher sensitivity level than the sensitivity level of the network address and the hardware identifier. As such, less sensitive information can be used for authentication if it is available and would meet the authentication level determined by the authentication hub.

The authentication hub 210 can provide the automated privacy control 233 described above through the use of an ensemble AI model. The AI model can determine an authentication level, and the types and amounts of authentication information that would meet that authentication level, based on the trust level of the client device, the sensitivity of the authentication information, and the security level of the requested resource, as further described below. Thus, information that is more sensitive (e.g., information that is more personal or private to the user, and that would cause a higher level of risk to the user should the information be leaked) may not be used for authentication in favor or using less sensitive information instead. Such automated privacy control 233 is useful because the authentication hub 210 may rely on third party data processing servers to validate the authentication information as described herein. By limiting the amount of sensitive authentication information distributed to these data processing servers, the authentication hub 210 can reduce the risk of the authentication information being intercepted or leaked, intentionally or unintentionally. Automated privacy control is further described below with respect to FIG. 3.

Another way that the authentication hub 210 can reduce the risk of sensitive information being intercepted or leaks is by applying secure multi-party computation 234 to the authentication information. Secure multi-party computation 234 is a process that uses cryptographic techniques to enable multiple entities to jointly compute a function while keeping their inputs (e.g., authentication information) into the function private. That is, a data processing server could validate authentication information without being able to determine or identify what the actual authentication information is (e.g., the authentication information is obfuscated). Using secure multi-party computation 234, authentication information does not need to be distributed to, or stored at, data processing servers, which could potentially be compromised, thereby maintaining the privacy of the authentication information.

To further improve privacy and security, the authentication information that is received by the authentication hub 210 in the access request can have already been obfuscated by the client device itself using secure multi-party computation techniques. That is, the client device obscures its authentication information using secure multi-party computation 234 instead of the authentication hub 234 performing this function. In this case, the authentication hub 210 may still be capable of determining the types of authentication information that are included in the access request, and may still be capable of validating the authentication information, but it would not be able to determine what a particular piece of authentication information was. For instance, the authentication hub 210 could determine that a hardware identifier was included in the authentication information, and it could determine that the hardware identifier is valid (e.g., it is the hardware identifier associated with a particular device or account), but it could not determine the number or code representing the hardware identifier itself. The data processing server may also be capable of validate authentication information that has been obfuscated using secure multi-party computation techniques. Thus, using secure multi-party computation techniques, the client device is capable of authenticating itself the sensitive authentication information itself may never leave the client device.

Secure multi-party computation 234 can be performed using Yao's garbled circuit or the Goldreich, Micali, and Wigderson (GMW) protocol, for example. Secure multi-party computation can use oblivious transfer, which is a cryptographic protocol executed between a sender and a receiver in which the receiver obliviously selects one of the inputs provided by the sender, and the receiver remains oblivious as to which of the inputs, from the sender, has been transferred to it. However, obvious transfer and other cryptographic algorithms (e.g., key generation) used in secure multi-party computation can complex and time-consuming in addition to creating larger message sizes. Secure multi-party computation is further described in International Patent Application No. PCT/US2017/024099, filed on Mar. 24, 2017 and titled "Authentication System Using Secure Multi-Party Computation," which is hereby incorporated by reference in its entirety.

To minimize the amount of network resources used, and to provide increased security only when needed, thereby reducing the amount of computational resources used, the authentication hub 210 can determine a sensitivity level of the authentication information in the access request, determine whether secure multi-party computation should be used based on the sensitivity level, and adjust the encryption parameters used in secure multi-party computation based on the sensitivity level and the riskiness of the client device. For example, the authentication hub 210 may require more authentication information to be validated for client devices that have a low trust level (e.g., there is a higher risk that the access request is fraudulent). However, the additional authentication information needed may be more sensitive. Accordingly, the authentication hub 210 can determine to only apply secure multi-party computation to the most sensitive authentication information, and it can adjust the encryption parameters to fit the risk of the client device, thereby reducing computing and network resources used (compared to applying secure multi-party computation to each piece of authentication information).

The AI used by the authentication hub 210 can determine the encryption parameters to be used in secure multi-party computation based on the sensitivity of the authentication information within the access request, the trust level of the client device, and the trust level of the data processing server. For example, the authentication hub 210 can use the automated AI to determine that shorter key lengths or reduced security parameters can be used in secure multi-party computation when sending authentication information to data processing servers having a higher trust levels. Thus, the authentication hub 210 can use the AI to select secure multi-party computation parameters that balance the privacy of the authentication information versus computational complexity and message size.

The authentication hub 210 also performs automated request modification 235, For example, the authentication hub 210 can append additional information, stored at the authentication hub 210, to the authentication request. The additional information may enable a particular data processing server to be capable of handling the authentication request. For example, if the authentication hub 210 has stored a hardware identifier for a particular client device from past access requests, and the data processing server would use the hardware identifier for authentication, then the authentication hub 210 can add the hardware identifier to the authentication request sent to the data processing server, even if the client device did not include the hardware identifier in the access request that is currently being processed.

C. Dynamic Message Routing

After determining the set of authentication information to be included in the authentication request, the authentication hub 210 can generate an authentication request message including that set of authentication information, After the authentication request message has been generated, the authentication hub 210 can perform dynamic message routing 240. The dynamic message routing 240 process can include automated data process interface adaptation 246, automated data processor evaluation 247, and adaptive network throttling 248.

The authentication hub 210 can perform automated data processor interface adaptation 246 for communications from data processing server using processes similar to those used in automated client interface adaptation 221 for communications from client devices. That is, the authentication hub 210 can generate API structures (e.g., using a linguistic parser) for each of the data processing servers. Then, the authentication hub 210 can modify an authentication request to match the API for a given data processing server using its API structure (e.g., the API structure determined by the authentication hub 210 for that particular data processing server). Thus, the authentication hub 210 can adapt the authentication requests to match the API protocol of the data processing server that they are being sent to.

The authentication hub 210 can also perform data processor evaluation 248. For example, the authentication hub 210 can evaluate the capabilities, authentication information requirements, exposure level, network condition (e.g., the response time between sending an authentication request by the authentication hub and the receiving of an authentication response from the data processing server), stability, accuracy, of each data processing server. The authentication hub 210 may evaluate the data processing servers prior to receiving an access request such that the evaluation does not slow down the processing of the access request.

The authentication hub 210 can use information from this evaluation in determining which data processing server to route an authentication request message to. For example, several data processing servers may be capable of validating a particular type of authentication information but each of the data processing servers may have different evaluated response times, stability levels, etc. The authentication hub 210 can use an AI to select a particular data processing server, based on the evaluated criteria, to send the authentication request to.

In addition, the authentication hub 210 can also evaluate the authentication responses received from the data processing servers. If the message received from the data processing server is suspicious (e.g., the formatting has changed compared to previously received responses from that same data processing server), then the authentication hub can determine to re-route authentication requests originally destined for that particular data processing server to different data processing servers that are capable of handling those authentication requests.

The authentication hub 210 can also perform adaptive network throttling 249. For example, the authentication hub 210 can use an AI to determine whether to throttle, or reroute, authentication requests to a particular data processing servers based on network response times from it. An adaptive network throttling algorithm can use an AI to automatically try to identify a data processing server that is overloaded based on historical network events outcomes. Given the recovery status the AI can determine whether to increase the throttle, decrease the throttle, or reroute to a different data processing server. Thus, dynamic message routing 240 enables that authentication hub 210 to determine a set of data processing servers that are capable of processing a particular authentication request and select the best data processing server to handle the request given the network conditions (e.g., response time for providing an authentication response).

D. Automated Restricting of Authentication Information

Figure 3:
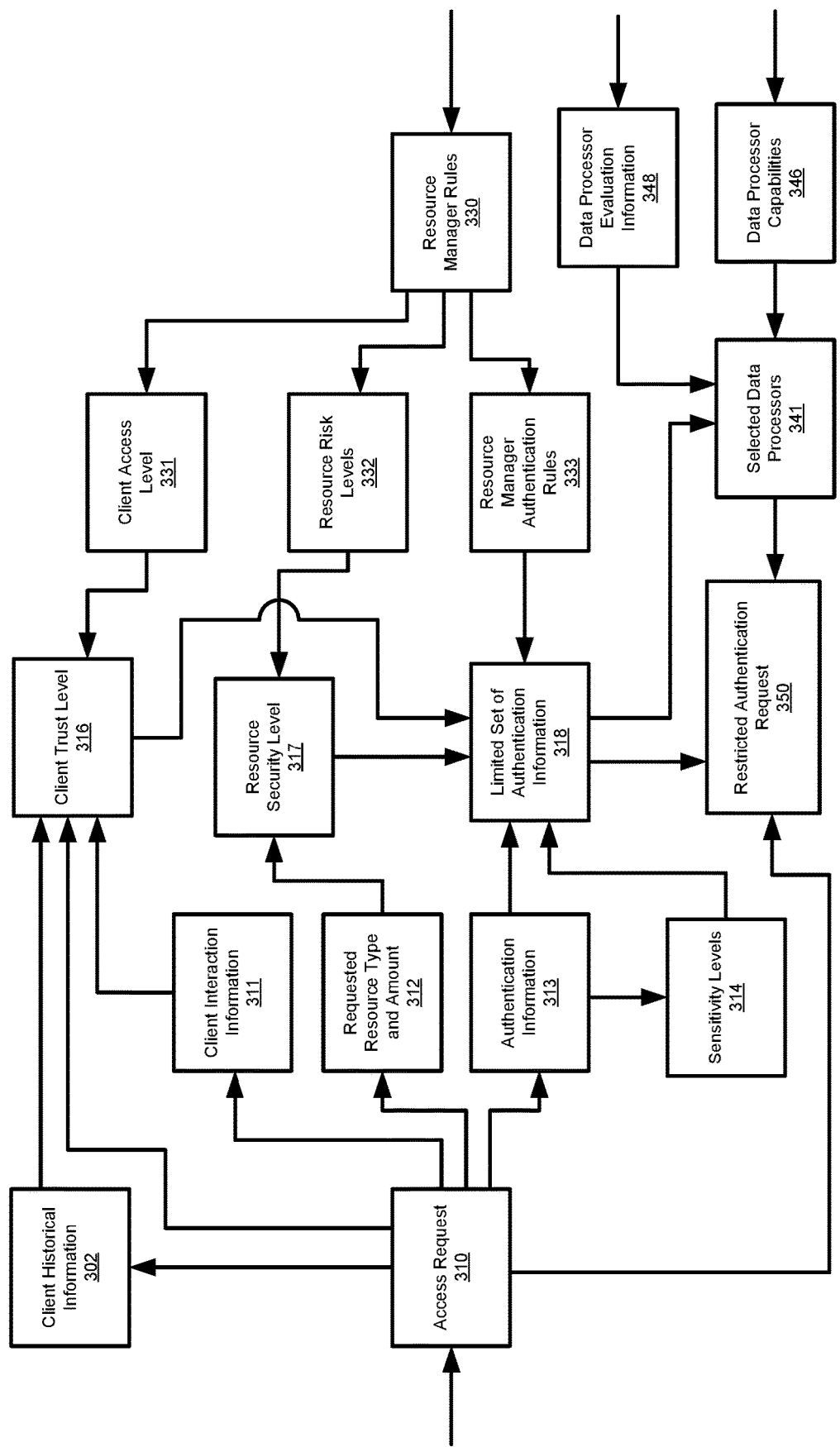
FIG. 3 shows an information flow diagram for automatically limiting the distribution of authentication information, in accordance with some embodiments

As discussed above, the authentication hub can use an AI algorithm to restrict the types and amount of authentication information that is distributed to the data processing servers in order to maintain privacy. FIG. 3 shows an information flow diagram for automatically limiting the distribution of authentication information, in accordance with some embodiments. The authorization hub can obtain the information shown in FIG. 3 using the processes described above with respect to FIG. 2.

Upon receiving an access request 310, the authentication hub can perform automated client interface adaptation in order to determine the information included in the access request, such as the client interaction information 311, the requested resource type and amount 312, and the authentication information 313. The authentication hub can store the access request and other information obtained during authentication to build client historical information 302.

After adapting the access request, the authentication hub can determine sensitivity levels 314 for each piece of authentication information 313. The sensitivity level for a particular type of authentication may be predetermined. For example, an address or social security number may be assigned a higher sensitivity level than an IF address.

The authentication hub can also determine a resource security level 317 based on the requested resource type and amount 312. For example, the greater the amount of resources requested 312, the higher the higher resource security level 317. The resource security level may also be based on resource risk levels 332 for certain types of resources 312, which can be set by the corresponding resource manager in a set of resource manager rules 330. Resource types having higher risk levels can have a higher resource security level 317.

The resource manager rules 330 can also include client access level 331 for some or all of the client devices. Client devices having a higher access levels 331 may need less authentication information to be validated in order to gain access to the requested resource compared to client devices having lower access levels 331.

The authentication hub can use AI algorithms to determine a client trust level 316 based on the access request 310, client historical information 302, the client interaction information 311, and the client access level 331. For example, the AI may determine that the client trust level 311 to be lower (e.g., the client is less trusted) if the current access request is drastically changed (e.g., is missing certain information or has a different format) compared to previously received access requests based on the client historical information 302.

The authentication hub can then use AI algorithms that balance the client trust level 316, the resource security level 317, and the sensitivity levels 317 to determine a limited set of authentication information 318. The limited set of authentication information 318 can be distributed to one or more the data processing server for validation. In addition, resource management authentication rules 333 (e.g., rules provided by a resource management computer) can indicate certain types of authentication information that should, or should not, be included in access requests or authentication requests. For example, rules set by a resource management computer may indicate that an personal address or the user, or a government-issued identifier of the user, should not be used.

The authentication hub can then determine which data processing servers that the authentication information should be routed to. As discussed above, the authentication hub can perform data processor evaluation to determine the performance and availability of each data processing server. The authentication hub can use AI algorithms to select one or more data processing servers to send authentication requests to. The selection of the one or more data processing servers can be based on the limited set of authentication information 318, the data processor capabilities 346, and the data processor evaluation information 348.

After selecting the data processing servers to user for authentication, the authentication hub can generate a restricted authentication request 350 that only includes needed the authentication information. The authentication hub may generate a different restricted authentication request 350 for each of the selected data processing servers 341 to further limit the distribution of sensitive information. Thus, the authentication hub can provide authentication of client devices to maintain resource security while limiting the distribution of sensitive authentication information.

III. Exemplary Methods for Processing Access Requests

Figure 4:
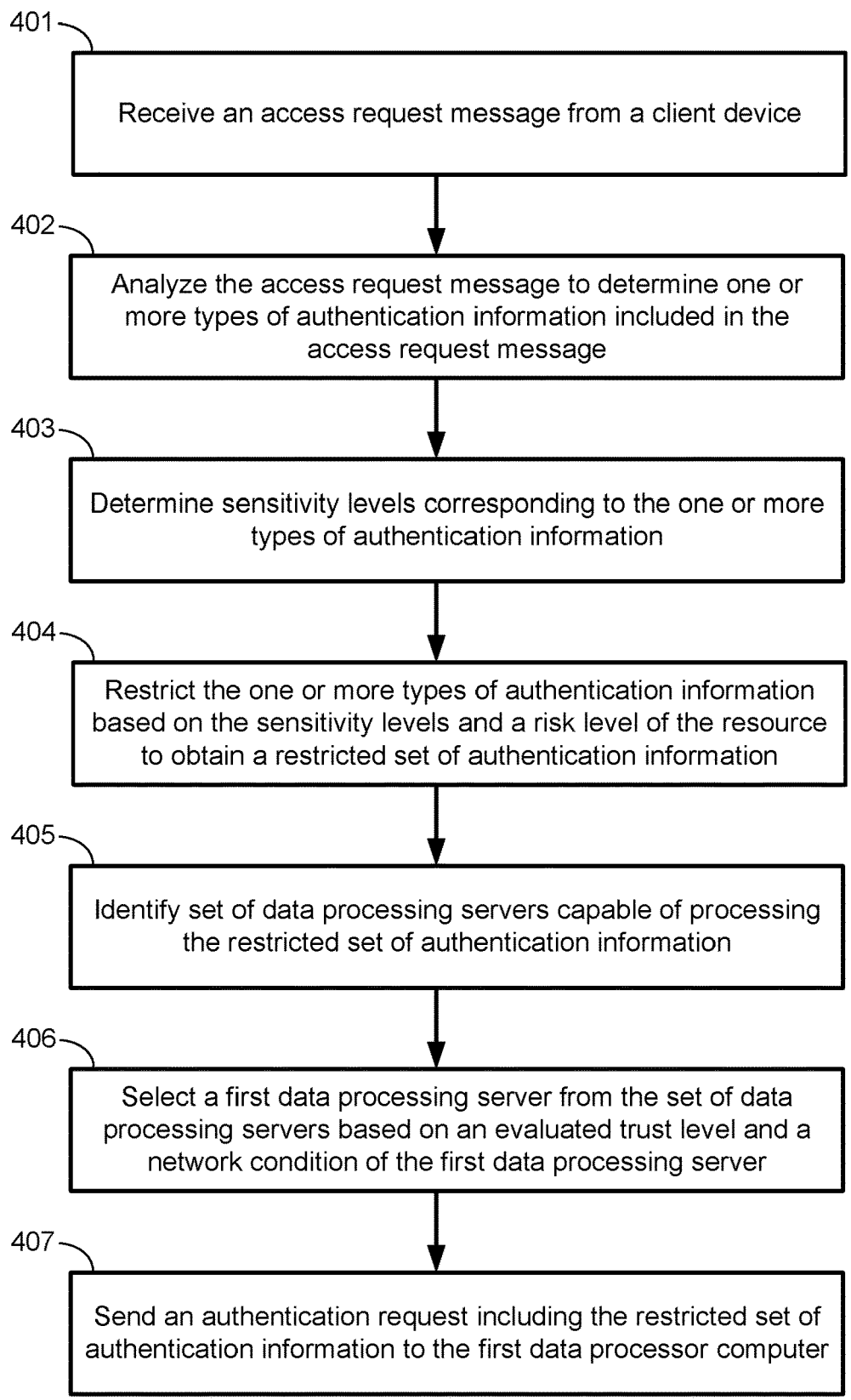
FIG. 4 shows a flow chart of an exemplary method for processing an access request, in accordance with some embodiments.

FIG. 4 shows a flow chart of an exemplary method for processing an access request, in accordance with some embodiments.

At 401, the method can include receiving an access request message from a client device, the access request message requesting access to a resource.

At 402, the method can further include analyzing the access request message to determine one or more types of authentication information included in the access request message. The method can further include generating a first data structure corresponding to a first format of the access request message using a linguistic parser. The analyzing of the access request message can be based on the generated data structure.

At 403, the method can further include determining sensitivity levels corresponding to the one or more types of authentication information.

At 404, the method can further include restricting the one or more types of authentication information based on the sensitivity levels and a risk level of the resource to obtain a restricted set of authentication information. The restricting of the one or more types of authentication information can include removing a certain type of authentication information or a portion of the certain type of authentication information.

The method can further include determining encryption parameters for secure multi-party computation based on the sensitivity levels. The method can further include applying secure multi-party computation encryption to a certain type of authentication information using the encryption parameters to restrict the one or more types of authentication information.

The method can further include determining a trust level for the client device based on historical access request information associated with the client device. The method can further include limiting or restricting the one or more types of authentication information is based on the trust level of the client device.

The method can further include comparing interaction information of the client device to an expected set of interactions. The method can further include determining the trust level for the client device is based on the comparison of the interaction information of the client device to the expected set of interactions.

At 405, the method can further include identifying a set of data processing servers capable of processing the restricted set of authentication information.

At 406, the method can further include selecting a first data processing server from the set of data processing servers based on an evaluated trust level and a network condition of the first data processing server.

The method can further include generating a second data structure corresponding to a second format used by the first data processing server for responding to authentication request messages using a linguistic parser. The method can further include generating the authentication request message based on the second data structure.

The method can further include adding stored authentication information associated with the client device to the authentication request based on the second data structure corresponding to the second format used by the first data processing server.

At 407, the method can further include sending an authentication request including the restricted set of authentication information to the first data processing server.

The method can further include receiving an authentication response message from the first data processing server. The authentication response message can indicate whether the restricted set of authentication information is valid. The authentication hub may authenticate the access request based on one or more types of the authentication information being validated by one or more data processing servers.

In order to coordinate the authentication of an access request, the authentication hub may assign an access request identifier to the access request. This access request identifier may be included in the authentication request messages sent to the data processing servers. The access request identifier may also be included in the authentication response message sent to the authentication hub, by the data processing servers. The authentication hub can track which pieces (e.g., types) of authentication information have been validated, or invalidated, by the data processing servers for a particular access request.

If one or more types of authentication information included in an access request cannot be validated, then the authentication hub may not authenticate the access request, and may not send the access request to the corresponding resource management computer. In some embodiments, the authenticate hub may authenticate an access request even if a certain type of authentication information could not be validated, based on the resource risk level, the client trust level, and the sensitivity level of other authentication information that was validated. In some embodiments, the authentication hub may determine to send additional authentication requests including authentication information that was previously determined to be within the limited set of authentication information that would be used for authentication.

The authentication hub may also track the timing, using a clock, of the authentication requests sent to the data processing servers and the timing of the authentication responses received from the data processing servers. The authentication hub may determine that a particular authentication request has timed out (e.g., been delayed or lost) if a predetermined amount of time has passed without receiving an authentication response. The authentication request may time out due to a poor network condition at the data processing server. For example, the data processing server may be overloaded with incoming requests and may not be able to receive or process each of the incoming requests within the predetermined time limit. A poor network condition of the data processing server may also be an indicator that the data processing server has been breached since worms and other malware may negatively impact the network performance and processing speed of the affected system.

If the authentication request has timed out, the authentication hub may determine another data processing server that is capable of processing the authentication information in the authentication request and send the authentication request to the other data processing server. Thus, the authentication hub can provide real time results despite a poor network condition at the data processing server.

For example, the authentication hub may have previously determined to not use biometric information to authentication the access request (e.g., the biometric information was not included in the limited set of authentication information). However, upon determined that another piece of authentication information could not be validated (e.g., based on an authentication response message from a data processing server), the authentication hub may send an access request including the biometric information to a capable data processing server for validation. In some embodiments, the authentication hub may request further authentication information from the client device to use for authentication. The authentication hub may determine to authenticate the access request if the further authentication information can be validated.

After authenticating the access request, the authentication hub may send the access request to the resource management computer that manages the requested resource. The resource management computer may then grant the client device, or the user of the client device, access to the requested resource. In some embodiments, the resource management computer may also validate authentication information provided by the client device (e.g., an account number or a password).

In some embodiments, the method can further include generating a third data structure, using a linguistic parser, corresponding to a third format used by the first data processing server for the authentication response message. In such embodiments, the method can further include comparing the third data structure to stored data structures used by the first data processing server for previously received authentication response messages. In some embodiments, the method can further include rerouting later authentication request messages to a second data processing server instead of the first data processing server based on the comparison of the third data structure to the stored data structures used by the first data processing server.

The method can further include sending the access request to a resource management computer that manages access to the resource based on the authentication information being valid.

The above description is illustrative and is not restrictive. Many variations of the embodiments may become apparent to those skilled in the art upon review of the disclosure. The scope of the embodiments may, therefore, be determined not with reference to the above description, but instead may be determined with reference to the pending claims along with their full scope or equivalents.

IV. Exemplary Computer System

The various participants and elements described herein may operate one or more computer apparatuses to facilitate the functions described herein. Any of the elements in the above-described figures, including any servers or databases, may use any suitable number of subsystems to facilitate the functions described herein.

Such subsystems or components are interconnected via a system bus. Subsystems may include a printer, keyboard, fixed disk (or other memory comprising computer readable media), monitor, which is coupled to display adapter, and others. Peripherals and input/output (I/O) devices, which couple to an I/O controller (which can be a processor or other suitable controller), can be connected to the computer system by any number of means known in the art, such as a serial port. For example, a serial port or an external interface can be used to connect the computer apparatus to a wide area network such as the Internet, a mouse input device, or a scanner. The interconnection via the system bus allows the central processor to communicate with each subsystem and to control the execution of instructions from system memory or the fixed disk, as well as the exchange of information between subsystems. The system memory and/or the fixed disk may embody a computer readable medium.

As described, the embodiments may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that any of the embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments has been presented for the purposes of illustration and description. It is not intended to be exhaustive or to limit the disclosure to the precise form described, and many modifications and variations are possible in light of the teaching above.

A recitation of "a," "an" or "the" is intended to mean "one or more" unless specifically indicated to the contrary. The use of "or" is intended to mean an "inclusive or," and not an "exclusive or" unless specifically indicated to the contrary. The use of the terms "first," "second," "third," "fourth," "fifth," "sixth," "seventh," "eighth," "ninth," "tenth," and so forth, does not necessary indicate an ordering or a numbering of different elements and may simply be used for naming purposes to clarify distinct elements. The use of "client" computer and "server" computer does not necessary indicate the intended use of the computers, but may simply be used for naming purposes.

All patents, patent applications, publications, and descriptions mentioned herein are incorporated by reference in their entirety for all purposes. None is admitted to be prior art,

What is claimed is:

1. A data security hub for processing and routing access request messages, the data security hub comprising:
   a computer readable storage medium storing a plurality of instructions; and
   one or more processors for executing the instructions stored on the computer readable storage medium to:
   receive an access request message from a client device, the access request message comprising a plurality of items of authentication information and requesting an access to a resource, the plurality of items of authentication information corresponding to one or more types of authentication information;
   analyze the access request message to determine the one or more types of the plurality of items of authentication information included in the access request message;
   determine sensitivity levels corresponding to the one or more types of authentication information;
   restrict the one or more types of authentication information based on the sensitivity levels and a risk level of the resource to obtain a restricted set of authentication information, wherein the restricted set of authentication information comprises fewer items of authentication information than the plurality of items of authentication information or at least one item of authentication information that is at least partially obfuscated among the plurality of items;
   identify a set of data processing servers capable of processing the restricted set of authentication information;
   select a first data processing server from the set of data processing servers based on an evaluated trust level and a network condition of the first data processing server; and
   send an authentication request including the restricted set of authentication information to the first data processing server.

2. The data security hub of claim 1, wherein the computer readable storage medium further stores instructions that cause the one or more processors to determine encryption parameters for secure multi-party computation based on the sensitivity levels and apply secure multi-party computation encryption to a certain type of authentication information using the encryption parameters.

3. The data security hub of claim 1, wherein the computer readable storage medium further stores instructions that cause the one or more processors to determine a trust level for the client device based on historical access request information associated with the client device, wherein the restricting of the one or more types of authentication information is further based on the trust level of the client device.

4. The data security hub of claim 3, wherein the computer readable storage medium further stores instructions that cause the one or more processors to compare interaction information of the client device to an expected set of interactions, wherein the determining of the trust level for the client device is further based on the comparison of the interaction information of the client device to the expected set of interactions.

5. The data security hub of claim 1, wherein the computer readable storage medium further stores instructions that cause the one or more processors to generate a first data structure corresponding to a first format of the access request message using a linguistic parser, where the analyzing of the access request message is based on the first data structure.

6. The data security hub of claim 1, wherein the computer readable storage medium further stores instructions that cause the one or more processors to:
   generate a second data structure corresponding to a second format used by the first data processing server for responding to authentication request messages using a linguistic parser; and
   generate the authentication request message based on the second data structure.

7. The data security hub of claim 6, wherein the computer readable storage medium further stores instructions that cause the one or more processors to add stored authentication information associated with the client device to the authentication request based on the second data structure corresponding to the second format used by the first data processing server.

8. The data security hub of claim 1, wherein the computer readable storage medium further stores instructions that cause the one or more processors to:
   receive an authentication response message from the first data processing server, the authentication response message indicating whether the restricted set of authentication information is valid; and
   send the access request message to a resource management computer that manages access to the resource based on the authentication information being valid.

9. The data security hub of claim 1, wherein the computer readable storage medium further stores instructions that cause the one or more processors to:
   receive an authentication response message from the first data processing server;
   generate a third data structure, using a linguistic parser, corresponding to a third format used by the first data processing server for the authentication response message;
   compare the third data structure to stored data structures used by the first data processing server for previously received authentication response messages, the comparison of the third data structure and the stored data structures indicating that the first data processing server may have been breached; and
   sending later authentication request messages to a second data processing server instead of the first data processing server based on the comparison of the third data structure to the stored data structures used by the first data processing server.

10. The data security hub of claim 1, wherein the one or more types of authentication information comprise a user information and a device information.

11. The data security hub of claim 1, wherein the one or more processors, by executing the instructions, are configured to generate the authentication request to include the restricted set of authentication information.

12. A method for processing and routing access request messages through a data security hub, the method comprising:
   receiving an access request message from a client device, the access request message comprising a plurality of items of authentication information and requesting an access to a resource, the plurality of items of authentication information corresponding to one or more types of authentication information;
   analyzing the access request message to determine the one or more types of the plurality of items of authentication information included in the access request message;

determining sensitivity levels corresponding to the one or more types of authentication information;

restricting the one or more types of authentication information based on the sensitivity levels and a risk level of the resource to obtain a restricted set of authentication information, wherein the restricted set of authentication information comprises fewer items of authentication information than the plurality of items of authentication information or at least one item of authentication information that is at least partially obfuscated among the plurality of items;

identifying a set of data processing servers capable of processing the restricted set of authentication information;

selecting a first data processing server from the set of data processing servers based on an evaluated trust level and a network condition of the first data processing server; and sending an authentication request including the restricted set of authentication information to the first data processing server.

13. The method of claim 12, further comprising determining encryption parameters for secure multi-party computation based on the sensitivity levels and applying secure multi-party computation encryption to a certain type of authentication information using the encryption parameters.

14. The method of claim 12, further comprising determining a trust level for the client device based on historical access request information associated with the client device, wherein the restricting of the one or more types of authentication information is further based on the trust level of the client device.

15. The method of claim 14, further comprising comparing interaction information of the client device to an expected set of interactions, wherein the determining of the trust level for the client device is further based on the comparison of the interaction information of the client device to the expected set of interactions.

16. The method of claim 12, further comprising generating a first data structure corresponding to a first format of the access request message using a linguistic parser, where the analyzing of the access request message is based on the first data structure.

17. The method of claim 12, further comprising:
generating a second data structure corresponding to a second format used by the first data processing server for responding to authentication request messages using a linguistic parser; and
generating the authentication request message based on the second data structure.

18. The method of claim 17, further comprising adding stored authentication information associated with the client device to the authentication request based on the second data structure corresponding to the second format used by the first data processing server.

19. The method of claim 12, further comprising:
receiving an authentication response message from the first data processing server, the authentication response message indicating whether the restricted set of authentication information is valid; and
sending the access request message to a resource management computer that manages access to the resource based on the authentication information being valid.

20. The method of claim 12, further comprising:
receiving an authentication response message from the first data processing server;
generating a third data structure, using a linguistic parser, corresponding to a third format used by the first data processing server for the authentication response message;
comparing the third data structure to stored data structures used by the first data processing server for previously received authentication response messages, the comparison of the third data structure and the stored data structures indicating that the first data processing server may have been breached; and
rerouting later authentication request messages to a second data processing server instead of the first data processing server based on the comparison of the third data structure to the stored data structures used by the first data processing server.

* * * * *